United States Patent …

(12) United States Patent
Fairy et al.

(10) Patent No.: US 9,550,317 B2
(45) Date of Patent: Jan. 24, 2017

(54) DROP-IN HOT RUNNER SYSTEM

(71) Applicant: Mold-Masters (2007) Limited, Georgetown (CA)

(72) Inventors: Fabrice Fairy, Strasbourg (FR); Chun Keung Mak, Markham (CA); Denis Babin, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 0 days.

(21) Appl. No.: 14/942,742

(22) Filed: Nov. 16, 2015

(65) Prior Publication Data

US 2016/0067899 A1    Mar. 10, 2016

Related U.S. Application Data

(63) Continuation of application No. 14/567,484, filed on Dec. 11, 2014, now Pat. No. 9,186,830.

(60) Provisional application No. 61/914,870, filed on Dec. 11, 2013.

(51) Int. Cl.
  *B29C 45/74*  (2006.01)
  *B29C 45/27*  (2006.01)
  *B29L 31/00*  (2006.01)

(52) U.S. Cl.
  CPC ............ *B29C 45/74* (2013.01); *B29C 45/2725* (2013.01); *B29C 45/2727* (2013.01); *B29C 45/2737* (2013.01); *B29C 2045/2729* (2013.01); *B29C 2045/2772* (2013.01); *B29C 2045/2791* (2013.01); *B29L 2031/757* (2013.01)

(58) Field of Classification Search
  CPC ............... B29C 2045/2729; B29C 2045/2772; B29C 2045/2791
  See application file for complete search history.

(56) References Cited

U.S. PATENT DOCUMENTS

| 5,507,637 | A  | 4/1996  | Schad et al. |
| 5,804,231 | A  | 9/1998  | Prophet et al. |
| 6,162,043 | A  | 12/2000 | Gellert |
| 6,561,790 | B2 | 5/2003  | Blais et al. |

(Continued)

FOREIGN PATENT DOCUMENTS

| CN | 202293204 U | 7/2012 |
| DE | 19601102 C2 | 7/1997 |

(Continued)

OTHER PUBLICATIONS

"Extended European Search Report", EP application No. 14004181.5, dated Apr. 24, 2015.

*Primary Examiner* — Jill Heitbrink

(74) *Attorney, Agent, or Firm* — Medler Ferro; Woodhouse & Mills PLLC

(57) ABSTRACT

A drop-in hot runner system includes a first runner component having a first channel aperture extending into a first runner component sliding surface, and a second runner component having a second channel aperture extending into a second runner component sliding surface. A depressible protrusion is associated with the first runner component, and a receiver is associated with the second runner component. The depressible protrusion and the receiver are positioned such that when the first runner component and the second runner component are coupled together along the first and second runner component sliding surfaces the depressible protrusion is received in the receiver, and the first and second channel apertures are misaligned.

26 Claims, 12 Drawing Sheets

(56) References Cited

U.S. PATENT DOCUMENTS

| | | |
|---|---|---|
| 7,189,071 B2 | 3/2007 | Olaru |
| 8,033,820 B2 | 10/2011 | Yu |
| 8,287,272 B1 | 10/2012 | Adas et al. |
| 8,425,222 B2 | 4/2013 | Uehira et al. |
| 2007/0218161 A1 | 9/2007 | Nagano et al. |
| 2007/0237854 A1 | 10/2007 | Yu |
| 2008/0023862 A1 | 1/2008 | Niewels et al. |
| 2010/0278962 A1 | 11/2010 | Kaushal |

FOREIGN PATENT DOCUMENTS

| | | |
|---|---|---|
| DE | 20014043 U1 | 12/2000 |
| JP | 10166393 A | 6/1998 |
| KR | 10-2009-0020117 A | 2/2009 |
| KR | 10-2011-0022823 A | 3/2011 |
| KR | 10-1031146 B1 | 4/2011 |
| WO | 2011008583 A1 | 1/2011 | though

DROP-IN HOT RUNNER SYSTEM

CROSS-REFERENCE TO RELATED APPLICATION

The present application is a continuation of U.S. patent application Ser. No. 14/567,484, filed Dec. 11, 2014, which claims the benefit under 35 U.S.C. §119(e) of U.S. Provisional Application No. 61/914,870, filed Dec. 11, 2013, the contents of both of which are incorporated by reference herein in their entirety.

FIELD OF THE INVENTION

The present invention relates to injection molding, and more particularly, to a hot runner system for an injection molding application.

BACKGROUND

"Drop-in" hot runner systems are those having nozzles that are connected to the manifold so that that the system can be installed into a mold as an assembled unit. Drop-in systems often have "screw-in" nozzles which are attached to the manifold by a threaded connection therebetween. Since the nozzles are secured to the manifold, thermal expansion of the manifold causes the position of each nozzle to be different when the hot runner is heated compared to when the hot runner system is unheated, (e.g. when the system is in a cold condition). However, when the hot runner system is installed in a mold, the downstream end of the nozzle is held in position relative to the mold, and thermal expansion of the manifold creates a side load on the nozzle.

In some instances the length of the nozzle is long enough to accommodate thermal expansion side loading by flexing or bending without also compromising the hot runner system and/or the mold. However, if the length of the nozzle is too short, or thermal expansion of the manifold is too great, side loading of the nozzle may compromise the hot runner system and/or the mold. Such instances require a nozzle that is coupled to the manifold to facilitate handling of the hot runner system as a unitary assembly, but is not subjected to excessive side loads when the manifold is heated.

"Flange" or compression seal nozzles have been loosely bolted to the manifold to facilitate handling the hot runner system as a unitary assembly. As the hot runner system is installed into the mold, the nozzle flange engages with a lead-in of a flange locating bore in a mold plate which causes the nozzle to slide relative to the manifold and find its precise cold condition location. This solution increases the difficulty in installing the hot runner system as the number of nozzles increases. Furthermore, the amount of "play" between the nozzle and the manifold required to allow each nozzle to find its position increases the likelihood of a hot runner component, such as nozzle tip, being damaged as the hot runner system is installed into the mold.

Flange nozzles have also been bolted to the manifold at their cold condition location by using dowels that extend through manifold and into the nozzle. To permit thermal expansion of the manifold, the dowels are removed from the nozzles prior to heating the manifold otherwise force created by thermal expansion of the manifold may damage the nozzle and/or the manifold. Also, this solution is only practical in applications where there is access to the dowels when the system is assembled, for example, with nozzles that do not have a valve actuator that is in line with the nozzle.

SUMMARY OF THE INVENTION

Embodiments hereof are directed towards a drop-in hot runner system including a first runner component having a first runner aperture extending into a first runner component sliding surface, and a second runner component having a second runner aperture extending into a second runner component sliding surface. A depressible protrusion is associated with the first runner component, and a receiver is associated with the second runner component. The depressible protrusion and the receiver are positioned such that when the first runner component and the second runner component are coupled together along the first and second runner component sliding surfaces the depressible protrusion is received in the receiver, and the first and second runner apertures are misaligned.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE DRAWINGS

Specific embodiments of the present invention are now described with reference to the figures, wherein like reference numbers indicate identical or functionally similar elements. The following detailed description is merely exemplary in nature and is not intended to limit the invention or the application and uses of the invention. In the following description, "downstream" is used with reference to the direction of mold material flow from an injection unit of an injection molding machine to a mold cavity of a mold, and also with reference to the order of components or features thereof through which the mold material flows from the injection unit to the mold cavity, whereas "upstream" is used with reference to the opposite direction. Furthermore, there is no intention to be bound by any expressed or implied theory presented in the preceding technical field, background, brief summary or the following detailed description.

Figure 1:
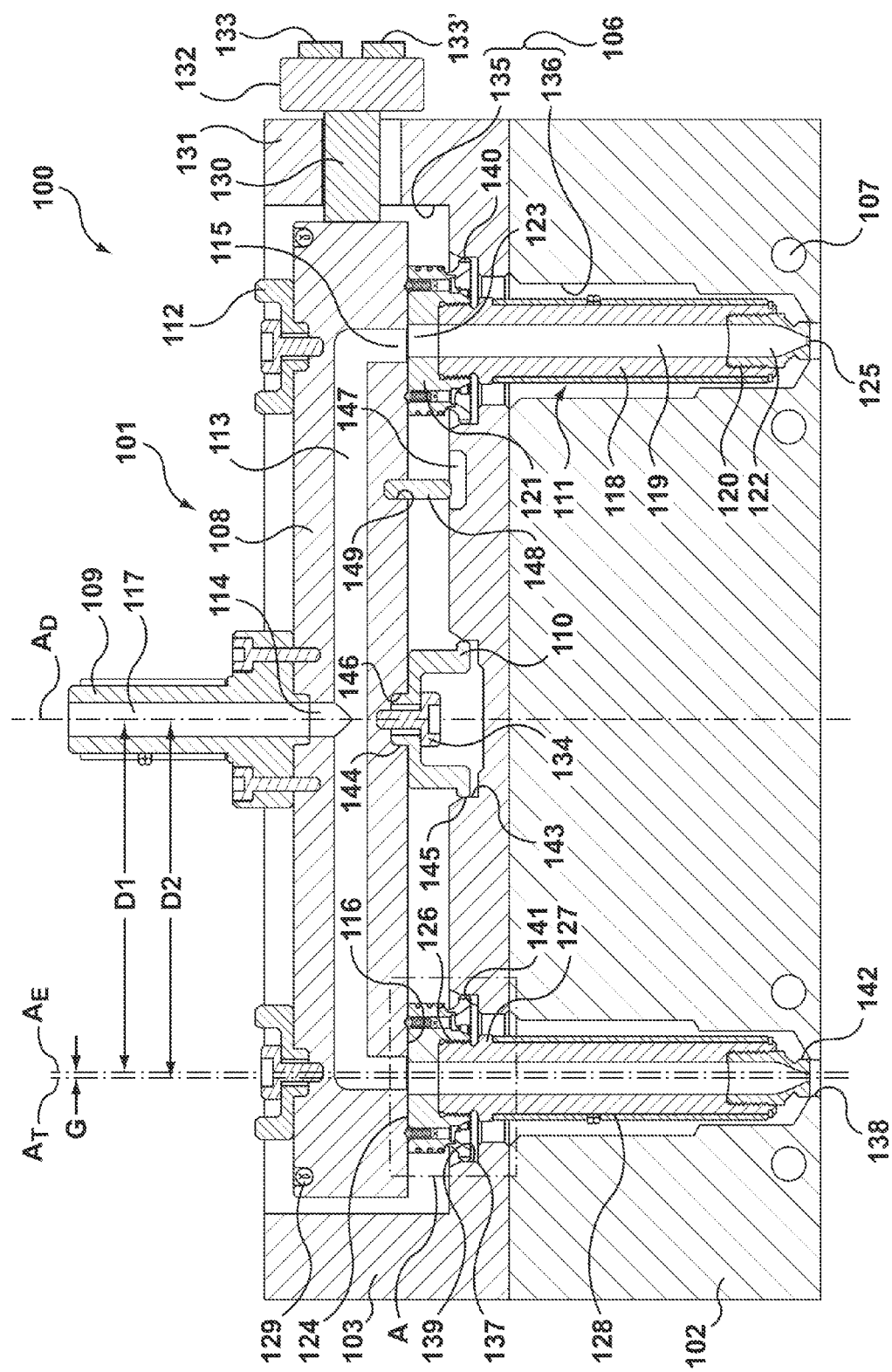
FIG. 1 is a sectional view of a partially assembled hot-half having a hot runner system in accordance with an embodiment hereof, and in a cold condition.
Figure 2:
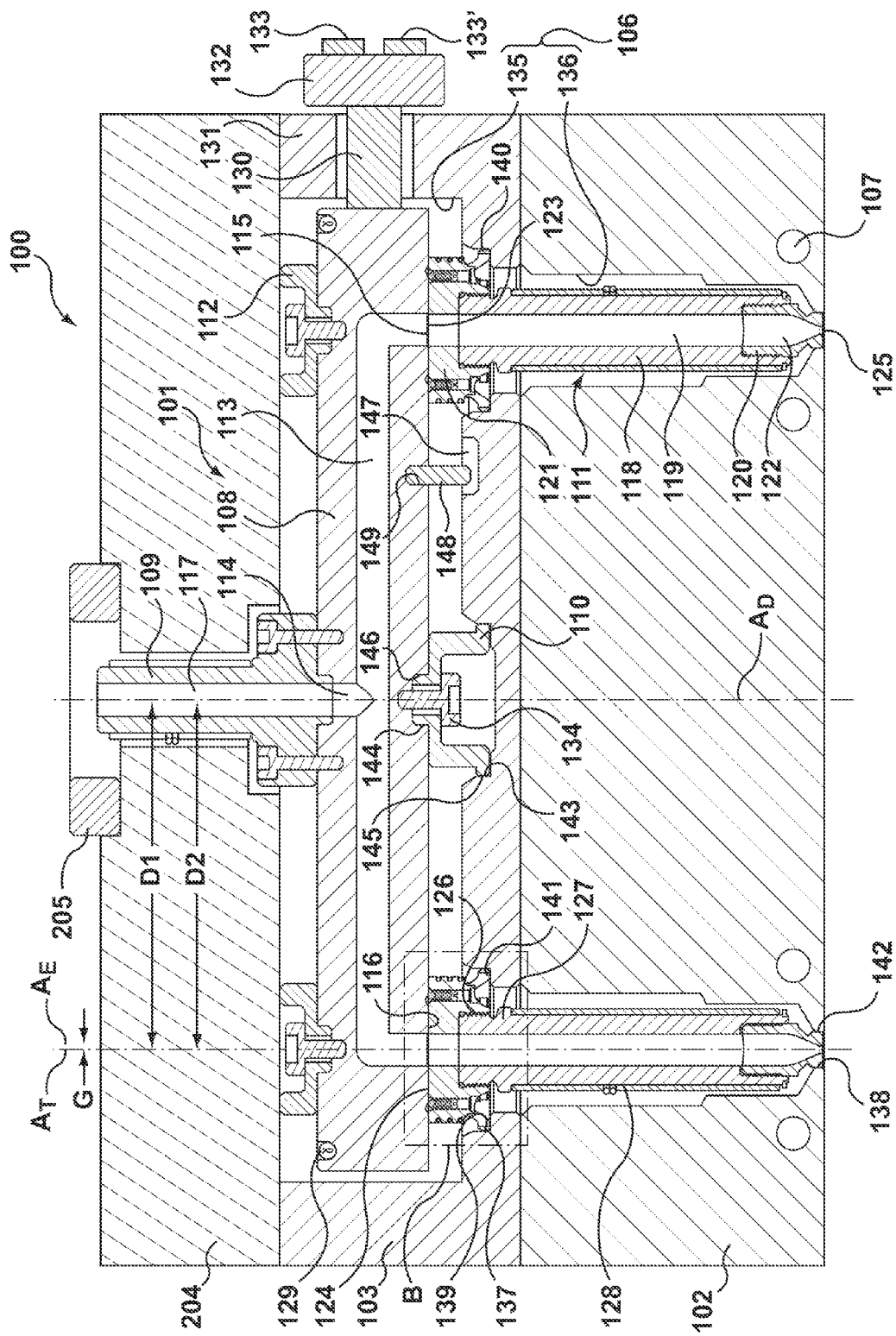
FIG. 2 is a sectional view of the hot-half of FIG. 1 in a fully assembled configuration and the hot runner system is heated to a processing temperature.

Referring to FIG. 1 and FIG. 2, in which FIG. 1 is a sectional view of a partially assembled injection molding system hot-half 100 having a hot runner system 101 in accordance with an embodiment hereof, and FIG. 2 is the hot-half 100 of FIG. 1 in a fully assembled configuration, and hot runner system 101 is heated to a processing temperature. Features and aspects of the current embodiment can be used accordingly with the other embodiments. Hot-half 100 includes, inter alia, a cavity plate 102 a manifold plate 103, a back plate 204, and a mold locating ring 205 by which hot-half 100 is located relative to a stationary platen an injection molding machine (not shown). Together, manifold plate 103 and cavity plate 102 define an opening 106 in which hot runner system 101 is received. Cavity plate 102, manifold plate 103, and back plate 204 include cooling channels, such as cooling channel 107 called out on cavity plate 102, through which cooling fluid is circulated to maintain the aforementioned mold plates at a molding temperature. Cavity plate 102, manifold plate 103, and back plate 204 can individually be referred to as a mold plate 102 or 103 or 104, or can collectively be referred to as mold plates 102, 103, 104. While three mold plates 102, 103, 104 are shown more or fewer mold plates are contemplated.

Hot runner system 101 includes, inter alia, a manifold 108, an inlet extension 109, a manifold locating ring 110, a nozzle 111, and a pressure pad 112. Manifold 108 includes a manifold melt channel or runner 113 extending between a manifold inlet 114 and a manifold outlet 115. Manifold 108 can be referred to as a runner component 108, and manifold inlet 114 and manifold outlet 115 can be referred to as channel or runner apertures 114, 115. As manifold 108 is heated to a processing temperature, the size of manifold 108 increases. Such an increase is size can be referred to as heat expansion, thermal expansion, or growth of manifold 108 etc. Thermal expansion of manifold 108 includes growth of manifold 108 along its length (left and right as viewed on page) across its width (into and out of the page view), and across it's thickness (up and down as viewed on page). As discussed herein, unless otherwise indicated, thermal expansion of manifold, manifold growth etc. refers to lateral growth of manifold 108, i.e., growth of manifold 108 along its length.

Hot-half 100 includes a datum axis $A_D$, an expansion axis $A_E$, and a target axis $A_T$. Datum axis $A_D$ is a reference axis from which lateral expansion of manifold 108 is measured. In the current embodiment expansion axis $A_E$ is reference axis that is related to manifold 108, and the position of expansion axis $A_E$ changes as manifold 108 is heated from a cold condition, in which expansion axis $A_E$ is closer to datum axis $A_D$, to a hot condition, in which $A_E$ is further away from datum axis $A_D$. In the current embodiment expansion axis $A_E$ extends through the center of manifold outlet 115 as measured at a sliding surface 116 on the downstream side of manifold 108.

Manifold 108 has a single inlet 114 and a plurality of outlets 115. Inlet 114 receives a stream of moldable material from a molding machine (not shown) via an inlet channel 117 in inlet extension 109 and distributes the stream of moldable material to manifold outlet 115 via manifold channel 113. In the current embodiment, manifold 108 includes two manifold outlets 115, each of which is in fluid communication with a separate nozzle 111. Thermal expansion of manifold 108 moves outlet 115 away from datum axis $A_D$. When manifold 108 is unheated, or in the cold-condition, (as shown in FIG. 1 and in FIG. 4A), the distance D1 between datum axis $A_D$ and expansion axis $A_E$ is less than the distance D2 between datum axis $A_D$ and target axis $A_T$. That is, expansion axis $A_E$ and manifold outlet 115 are both closer to datum axis $A_D$ than are target axis $A_T$ and a nozzle inlet 123, which results in manifold outlet 115 being misaligned with nozzle inlet 123 by an expansion gap G (shown in FIG. 4A) that is equal to distance D2 minus distance D1. When heated to an operating temperature it is intended that lateral expansion of manifold 108 will move manifold outlet 115 away from datum axis $A_D$ by an amount that is equal to the size of gap G.

Nozzle 111 includes, inter alia, a nozzle body 118, a nozzle melt channel or runner 119, a nozzle tip 120, and a nozzle flange 121. In the current embodiment nozzle body 118 and nozzle flange 121 are separable components. Nozzle channel 119 is in fluid communication between manifold outlet 115 and a tip channel 122 extending through nozzle tip 120. At its upstream end, nozzle channel 119 includes nozzle inlet 123, and target axis $A_T$ extends through the center of nozzle inlet 123 as measured at a sliding surface 124 of nozzle. Nozzle 111 can be referred to as a runner component 111, and nozzle inlet can be referred to as a channel or runner aperture 123. Nozzle tip channel 122 is in fluid communication with a mold cavity (not shown) via a mold gate 125. In the current embodiment nozzle tip channel 122 and mold gate 125 are in line with nozzle inlet 123. As shown, nozzle tip 120 is a one piece component that defines mold gate 125; however, other tip and mold gate arrangements are contemplated. At its upstream end nozzle body 118 includes external threads 126 for coupling nozzle body 118 to nozzle flange 121, and a radially projecting shoulder 127 having a plurality of wrench flats for mating with a suitable tool (not shown) for coupling and decoupling of nozzle body 118 together with flange 121.

Hot runner system 101 is heated by suitable heaters, such as sleeve heater 128 called out on nozzle body 118, and pressed-in element heater 129 called out on manifold 108. Heaters 128, 129 and their associated thermocouples (not shown) are connected to a hot runner controller (not shown) to control the temperature of hot runner system 101.

A conduit or frame 130 is coupled to manifold 108 for routing wires, cables, etc. that are associated with the operation of hot runner system 101. Frame 130 extends through a lateral opening 131 in manifold plate 103 and is coupled to an electrical box 132 having respective power and thermocouple connectors 133, 133' by which hot runner system 101 is coupled to the hot runner controller.

Hot runner system 101 is a "drop-in" hot runner system which can be handled as a unitary assembly. As such, nozzle 111, inlet extension 109, pressure pad 112, manifold locating ring 110, and frame 130 are coupled to manifold 108, for example, by suitable fasteners, such as a socket head cap screw 134 called out on manifold locating ring 110. In the current embodiment hot runner system 101 is depicted as having two thermally gated nozzles 111 by way of example and not limitation. It will be appreciated that hot runner system 101 can also include valve gated nozzles and valve actuators, or can include a combination of valve gated nozzles and thermally gated nozzles.

Hot runner system 101 is received in opening 106 which includes a pocket 135 and a stepped bore 136. In the current embodiment pocket 135 is defined by manifold plate 103, and is sized to create an insulating air space between manifold plate 103 and manifold 108. As shown in FIG. 2, when hot-half 100 is assembled manifold 108 is enclosed within pocket 135 by back plate 204. Stepped bore 136 extends from pocket 135 through manifold plate 103 and cavity plate 102, and is sized to create an insulating air space between nozzle body 118 and mold plates 103, 102. Stepped bore 136 includes an internal shoulder 137 at its upstream end, and a circumferential sealing surface 138 at its downstream end that is sized to create a seal between nozzle tip 120 and cavity plate 102. An inner surface 139 of shoulder 137 is sized to receive an alignment surface 140 of nozzle flange 121. As shown in FIG. 1, hot-half 100 is only partially assembled, and alignment surface 140 of nozzle flange 121 is not seated against internal shoulder 137, whereas in FIG. 2 hot-half 100 is fully assembled, and alignment surface 140 is seated in internal shoulder 137. A face 141 of shoulder 137 provides a bearing surface which supports flange 121. In operation, the thermal expansion of manifold 108 across its thickness causes manifold 108 to press upon back plate 204 via pressure pad 112, and to press upon manifold plate 103 via engagement between flange 121 and face 141 of shoulder 137, which creates a sealing force between manifold outlet 115 and nozzle inlet 123. Since nozzle flange 121 is fixed in position between face 141 of shoulder 137 in manifold plate 103 and manifold 108, as nozzle 111 is heated to a processing temperature, the length of nozzle 111 grows (downward as viewed in FIG. 2), and a sealing surface 142 of nozzle tip 120 slides within circumferential sealing surface 138. Nozzle 111, flange 121, and stepped bore 136 can be sized such that as hot runner system 101 is installed in opening 106, flange alignment surface 140 engages with shoulder inner surface 139 which pre-aligns nozzle 111 relative to cavity plate 102 prior to nozzle tip sealing surface 142 engaging with sealing surface 138 in cavity plate 102.

Continuing with FIGS. 1 and 2, in the current embodiment datum axis $A_D$ extends through the center of a datum bore 143 in manifold plate 103. Manifold 108 is positioned relative to datum bore 143 via manifold locating ring 110 which includes two locating ends: a manifold locating end 144 and a plate locating end 145. Manifold locating end 144 is received in a manifold datum bore 146 on the downstream surface of manifold 108, and plate locating surface 145 is received in datum bore 143 in manifold plate 103. Manifold locating ring 110 aligns manifold datum bore 146, and thus manifold 108 with datum axis $A_D$. In the current embodiment, manifold datum bore 146 is positioned on the downstream surface of manifold 108 opposite from inlet extension 109 such that, in addition to aligning manifold 108 relative to manifold plate 103, manifold locating ring 110 also supports manifold 108 against the force created by the machine nozzle (not shown) engaging with inlet extension 109.

A slot/dowel dowel arrangement in combination with manifold locating ring 110 is used to control the angular orientation manifold 108. In the current embodiment manifold plate 103 includes a slot or groove 147, and a dowel 148 that projects from a bore 149 in the downstream surface of manifold 108 (as shown in FIG. 2) is received in slot 147. Dowel 148 and slot 147 are sized so as to allow slidable movement therebetween while not impinging upon thermal expansion of manifold 108. Slot 147 is an elongate groove provided in the bottom of pocket 135. Slot 147 is in line between datum bore 143 and inner surface 139 of shoulder 137, and dowel bore 149 is in line between manifold datum bore 146 and manifold outlet 115. Accordingly, engagement between dowel 148 and slot 147 aligns the angular position of expansion axis $A_E$ relative to target axis $A_T$ such that lateral thermal expansion of manifold 108 brings expansion axis $A_E$ and outlet 115 into alignment with target axis $A_T$ and nozzle inlet 123. Once hot runner system 101 is heated to a required processing temperature expansion axis $A_E$ and target axis $A_T$ are aligned to create a smoother transition for molding material flowing between manifold outlet 115 and nozzle inlet 123 than when hot runner system 101 is unheated.

Figure 3:
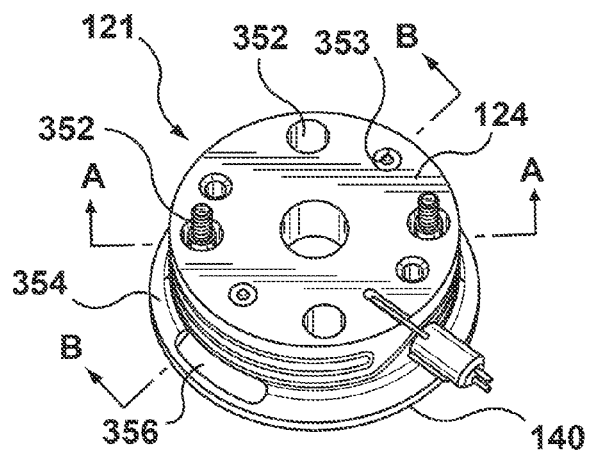
FIG. 3 is a perspective view of the nozzle flange of the hot runner system of in FIG. 1
Figure 3A:
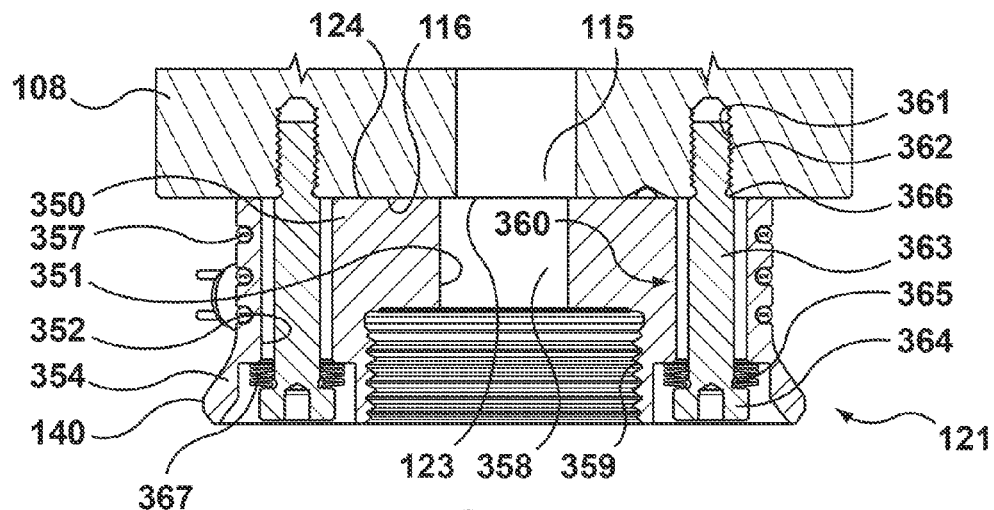
FIG. 3A is a sectional view of FIG. 3 taken along line A-A.
Figure 3B:
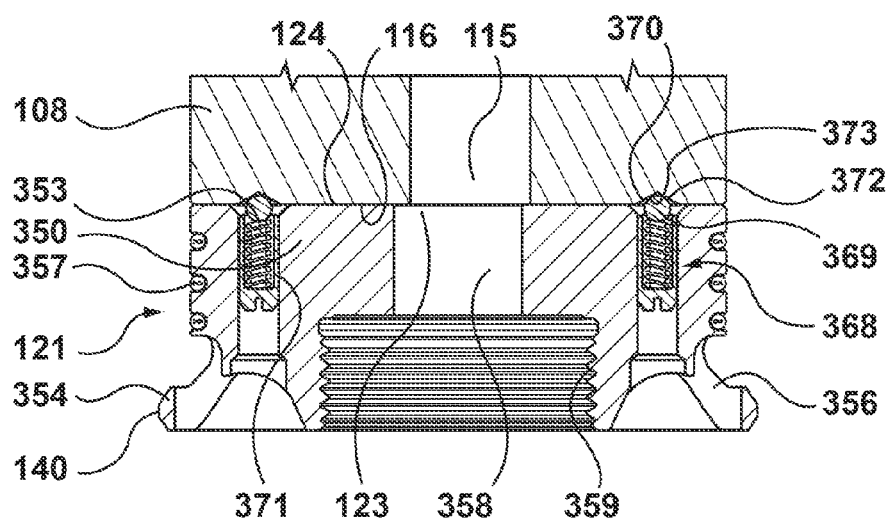
FIG. 3B is a sectional view of FIG. 3 taken along line B-B

Continuing with FIG. 1 and FIG. 2, and also referring to FIG. 3, FIG. 3A, and FIG. 3B, in which FIG. 3 is a perspective view of nozzle flange 121, FIG. 3A is a sectional view of FIG. 3 taken along line A-A, and FIG. 3B is a sectional view of FIG. 3 taken along line B-B. Nozzle flange 121 defines nozzle sliding surface 124, and includes a body portion 350, a stepped bore 351, a clearance bore 352 (shown in FIG. 3A), a locating bore 353 (shown in FIG. 3B), and a support ring 354 which defines alignment surface 140. Nozzle flange 121 further includes an opening 356 extending between stepped bore 136 in mold plate 102, 103 and pocket 135 through which wires associated with nozzle heater 128 pass. Nozzle flange 121 also includes a heater 357 and a thermocouple (not shown); however, heater 357 is optional and may be omitted if not required by the particular molding application.

Stepped bore 351 extends through body portion 350 and includes a transfer channel 358 and internal threads 359. Transfer channel 358 extends between nozzle sliding surface 124 and internal threads 359 and serves as an upstream portion of nozzle channel 119 such that nozzle inlet 123 is located at the upstream end of transfer channel 358. Internal threads 359 mate with external threads 126 of nozzle body 118 to couple nozzle body 118 and nozzle flange 121 together. In the current embodiment nozzle channel 119 and transfer channel 358 are aligned by engagement between external threads 126 and internal threads 359. In an alternative embodiment (not shown) concentric alignment between nozzle channel 119 and transfer channel 358 is facilitated by an outer-cylindrical surface (not shown) at the upstream end of nozzle body 118 that is concentric with nozzle channel 119, and is proximate to external threads 126 that mates with an inner-cylindrical surface of stepped bore 351 that is concentric with transfer channel 358 and is proximate to internal threads 359.

As shown in FIG. 3A, clearance bore 352 extends from sliding surface 124 through body portion 350. A fastener 360 extends through clearance bore 352 and is received in a threaded fastening bore 361 in manifold 108 to attach nozzle flange 121 to manifold 108. In the current embodiment fastener 360 is a shoulder bolt having a threaded end portion 362 a shank 363 and a head portion 364. A first shoulder 365 is defined between head portion 364 and shank 363 and a second shoulder 366 is defined between shank 363 and threaded end portion 362. When assembled, threaded end portion 362 is received in fastening bore 361 until second shoulder 366 engages with sliding surface 116, and as manifold 108 expands laterally fastener 360 is moved laterally therewith. The diameter of clearance bore 352 is sized to accommodate displacement of fastener 360 without impinging on thermal expansion of manifold 108. In an alternative embodiment (not shown), clearance bore 352 is an oval or elliptical bore that is configured to accommodate displacement of fastener 360.

Continuing with FIG. 3A, a spacer 367 is provided between first shoulder 365 and body portion 350. In the current embodiment, spacer 367 is a disk spring or a plurality of disk springs stacked together. A suitable disk spring is, for example, a heat resistant disk spring available from Schnorr of Ann Arbor Mich., USA. The combined length of clearance bore 352 and spacer 367 is greater than the length between second shoulder 366 and first shoulder 365 of fastener 360. Tightening fastener 360 until second shoulder 366 engages with the downstream surface of manifold 108 causes head portion 364 to energize or compress spacer 367 which creates a compression or holding force between sliding surface 124 of nozzle 111 and sliding surface 116 of manifold 108 that aids in holding nozzle 111 in position on manifold 108 during installation of hot runner system 101.

Turning to FIG. 3B, locating bore 353 extends from sliding surface 124 through body portion 350. A biasing member 368 is seated in locating bore 353. Biasing member 368 includes a depressible protruding portion or protrusion 369 that projects into a locating recess or receiver 370 in sliding surface 116 of manifold 108. Compression force between nozzle sliding surface 124 and manifold sliding surface 116 also creates an end force between an external load surface 372 of protrusion 369 and an internal load surface 373 of receiver 370. In the current embodiment biasing member 368 is a ball plunger that is engaged with locating bore 353 via threads 371. A suitable ball plunger is, for example, a high temperature stainless steel ball plunger available from Vlier Inc. of Hopkinton Mass. USA.

When nozzle 111 is coupled to manifold 108 such that biasing member 368 is energized, protrusion 369 and receiver 370 cooperate to align nozzle 111 relative to manifold 108 in a drop-in or cold condition position in which the distance from the center of nozzle inlet 123 to the center of manifold datum bore 146 is substantially equal to distance D2. When hot runner system 101 is installed in hot-half 100 thermal expansion of manifold 108 causes relative lateral movement between receiver 370 and protrusion 369 which is seated in locating bore 353 causes internal load surface 373 of receiver 370 to act upon external load surface 372 of protrusion 369 to depress protrusion 369 and compress biasing member 368 which allows manifold outlet to grow into its hot condition position in which the distance from the center of manifold outlet 115 to the center of manifold datum bore 146 is also substantially equal to distance D2.

The magnitude of end-force between external load surface 372 and internal load surface 373 can be adjusted by changing the amount that biasing member 368 is compressed when nozzle 111 and manifold 108 are coupled together. For example, threading biasing member 368 (ball plunger) further into or out of locating bore 353 via threads 371 changes elevation of protrusion 369 relative to sliding surface 124. If protrusion 369 (ball portion of ball plunger) is adjusted to be farther away from sliding surface 124, biasing member 368 will be compressed more, and thus energized more, in comparison to when protrusion 369 (ball portion) is relatively closer to sliding surface 124. To lock the elevation of protrusion 369 relative to sliding surface 124, another threaded fastener (not shown) may be installed into locating bore 353 behind biasing member 368 to prevent biasing member 368 (ball plunger) from rotating.

The pattern of receivers 370 is reflectionally symmetric to the pattern of locating bores 353, with the plane of symmetry being defined by nozzle sliding surface 124 and manifold sliding surface 116 when hot runner system 101 is assembled. Similarly, the pattern of clearance bores 352 is reflectionally symmetric to the pattern chosen for fastening bores 361, and the plane of symmetry is also defined by nozzle sliding surface 124 and manifold sliding surface 116 when hot runner system 101 is assembled. Regardless of the specific layout chosen, the relative position of each locating bore 353 and its corresponding receiver 370 is such that when manifold 108 is unheated, manifold outlet 115 and nozzle inlet 123 are misaligned by an amount that is equal to expansion gap G (gap G being shown in FIG. 4A), whereas locating bore 353 and receiver 370 are aligned, and protrusion 369 is seated in receiver 370.

In the current embodiment flange 121 includes a plurality of clearance bores 352 and locating bores. As shown in FIG. 3, flange 121 includes four clearance bores 352 that are positioned at 90° intervals around central bore 351 and four locating bores 353 that are also positioned at 90° intervals around central bore 351, and are offset by 45° relative to clearance bores 352. Accordingly, manifold 108 includes four threaded bores 361 and four receivers 370 in a pattern that is reflectionally symmetric to that of clearance bores 352 and locating bores 353. This arrangement allows nozzle flange 121 to be coupled to manifold 108 at four different orientations. In an alternative embodiment, one or more of the plurality of locating bores 353 (biasing members 368) and clearance bores 352, and its corresponding threaded bore 361 and receiver 370 is offset relative to the remaining locating bores 353 (biasing members 368) and clearance bores 352, and threaded bores 361 and receivers 370 such that nozzle flange 121 can be coupled to manifold 108 in less than four discrete orientations. In the current embodiment clearance bores 352 are equispaced from nozzle inlet 123, as are locating bores 353, whereas threaded bores 361 and receivers 370 are offset relative to manifold outlet 115 in a direction away from datum axis $A_D$ by an amount that is equal to the amount that manifold outlet 115 is expected to move when manifold 108 is heated to an operating temperature.

Figure 4A:
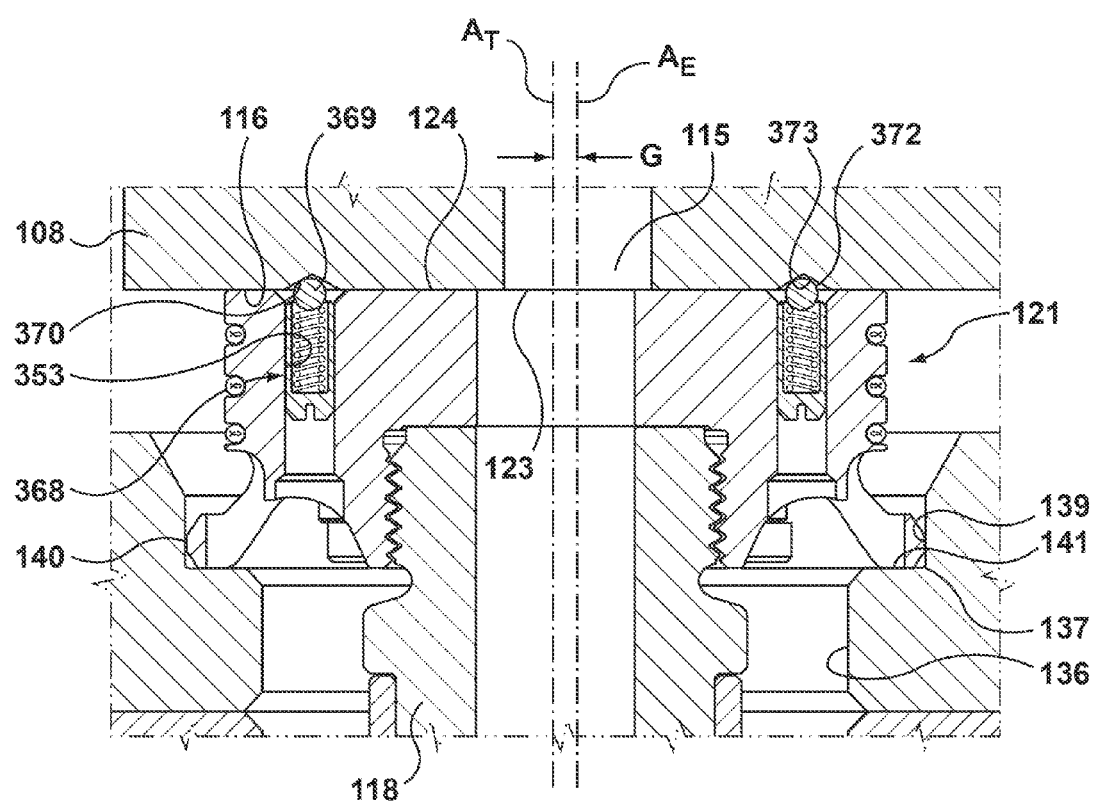
FIG. 4A is enlarged view of a portion A of FIG. 1.
Figure 4B:
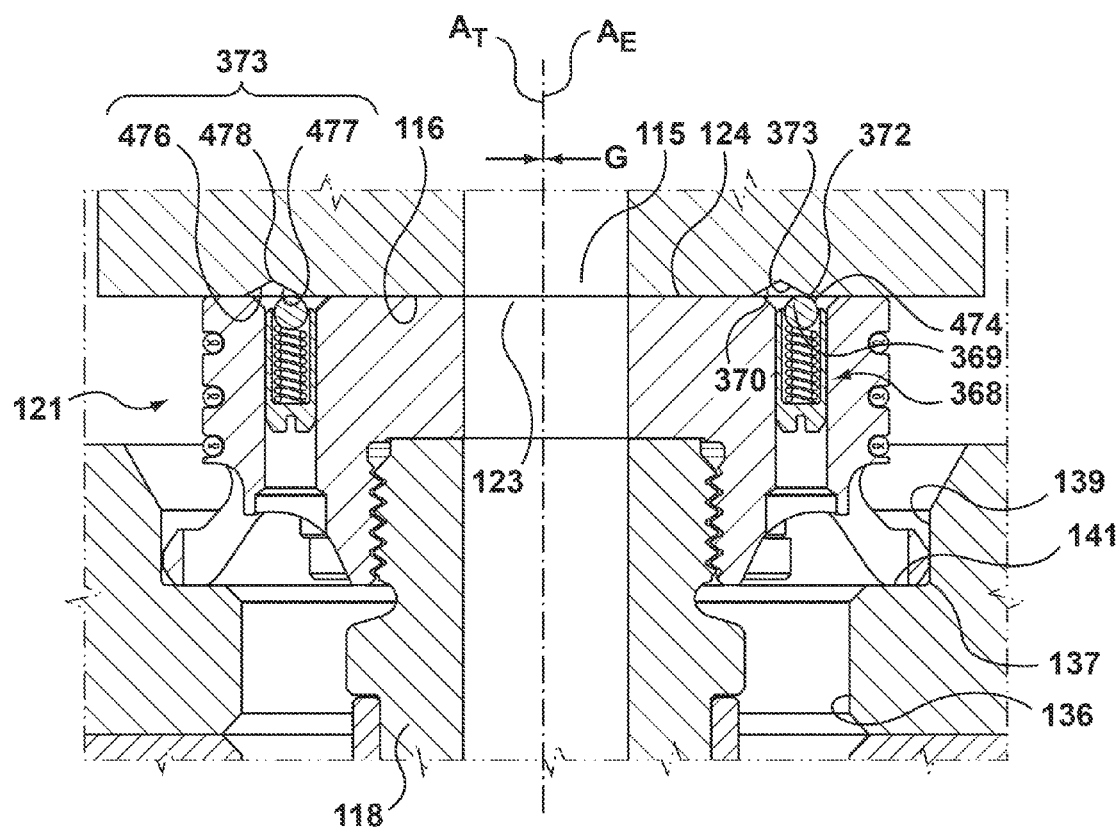
FIG. 4B is an enlarged view of a portion B of FIG. 2.

Continuing with FIG. 1 and FIG. 2, and also referring to FIG. 4A and FIG. 4B, in which FIG. 4A is enlarged view of a portion A of FIG. 1; however nozzle flange 121 is seated in shoulder 137 of stepped bore 136, and FIG. 4B is an enlarged view of a portion B of FIG. 2. In the current embodiment protrusion 369 is a convexity that projects beyond sliding surface 124 of nozzle 111 and into receiver 370, and a profile of external load surface 372 has a cross-section that is generally circular or curved. Other shapes for protrusion 369 are also contemplated, non limiting examples of with include, an angular protrusion, a conical protrusion, a tapered protrusion, and a parabolic protrusion, among others; convex shapes having an inclined or sloped surface that is configured to cooperate with receiver 370 to compress biasing member 368 when hot runner system 101 is installed in mold plates 102, 103, and manifold 108 grows laterally as a result of heat expansion.

In the current embodiment receiver 370 is a concavity or recess in sliding surface 116 of manifold 108, and as receiver 370 is displaced laterally, as measured along target axis $A_T$, the depth from sliding surface 116 to internal load surface 373 becomes shallower. In the current embodiment if locating bore 353 and receiver 370 are concentric, the contact area between external load surface 372 and internal load surface 373 is an annular line contact area.

Continuing with FIG. 4B, a profile of internal load surface 373 has a cross-section that is generally angular or tapered. Internal load surface 373 has opposing sides 476, 477 that extend outward from a vertex 478 to manifold sliding surface 116. In the current embodiment opposing sides 375, 376 form a 120° included angle by way of example and not limitation. Other shapes for receiver 370 are also contemplated, examples of with include a curved depression or a spheroid shaped depression; shapes having an inclined surface, a curved surface, or a sloped surface that are configured to depress protrusion 369 and compress biasing member 368 as manifold 108 grows as a result of heat expansion. In an embodiment (not shown) if protrusion 369 and receiver 370 are shaped sized appropriately, receiver 370 can be a cylindrical bore. In such an embodiment if protrusion 369 is generally spherical, the diameter of receiver 370 is, for example, between one third and one half of the diameter of protrusion 369.

The specific shapes chosen for protrusion 369 and receiver 370 are such that when hot runner system 101 is installed in mold plates 102, 103 lateral movement between external load surface 372 and internal load surface 373 is translated into compression of biasing member 368. That is, protrusion 369 and receiver 370 are configured to cooperate such that, when hot runner system 101 is installed in hot-half 100 and is heated to a molding temperature, lateral movement between manifold 108 and nozzle 111 results in displacement of protrusion 368 in a direction parallel to datum axis $A_D$, and in the current embodiment, towards nozzle sliding surface 124. Thermal expansion of manifold 108 causes internal load surface 373 to press on external load surface 372 which compresses biasing member 368.

The characteristics of biasing member 368, protrusion 369, and receiver 370 facilitate secure cold condition positioning of nozzle 111 relative to manifold 108, while at the same time permitting manifold 108 to slide relative to nozzle 111 when hot runner system 101 is installed in hot half 100 and heated to a processing temperature. That is, as manifold 108 is heated to a processing temperature, receiver 370 interacts with protrusion 369 which causes internal load surface 373 to bear upon external load surface 373. More specifically, internal load surface 373 presses on external load surface 373 such that outward or lateral displacement of receiver 370 relative to datum axis $A_D$ pushes protrusion 369 in a direction away from manifold sliding surface 116. In other words, protrusion 369 and receiver 370 are configured as co-acting inclined, sloped, or curved surfaces that are conducive to translating an amount of motion in a first direction, i.e. lateral thermal expansion of manifold 108, into a lesser amount of motion in a direction perpendicular to the first direction, i.e. in a compression direction of biasing member 368, which frees manifold 108 and nozzle 111 from being held in their cold condition alignment.

Figure 5:
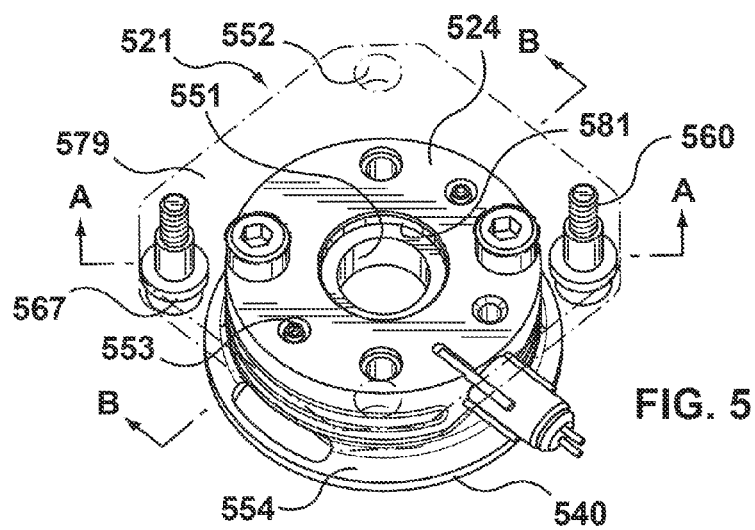
FIG. 5 is a perspective view of a nozzle flange in accordance with another embodiment hereof.
Figure 5A:
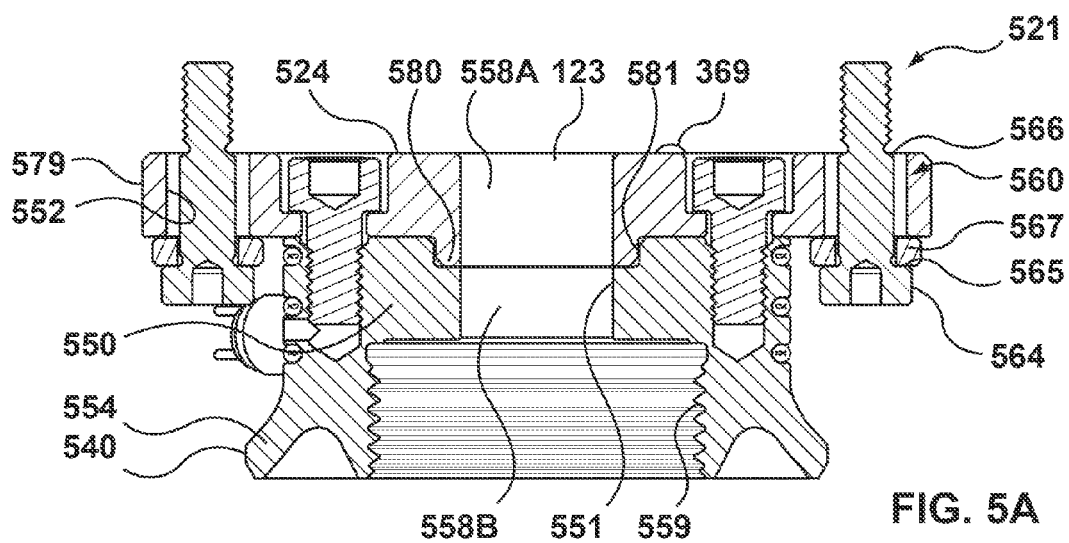
FIG. 5A is a sectional view of FIG. 5 taken along line A-A.
Figure 5B:
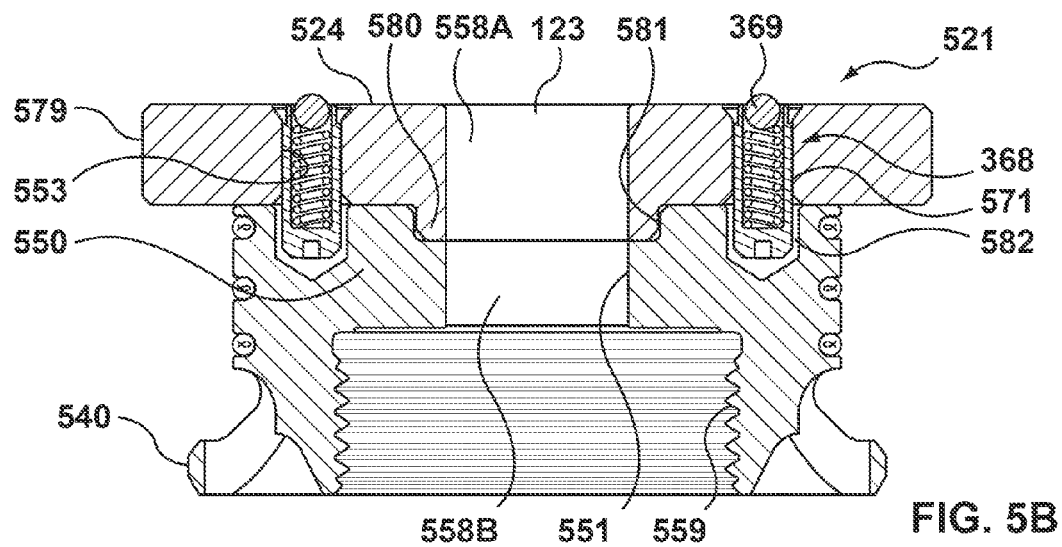
FIG. 5B is a sectional view of FIG. 5 taken along line B-B.

Referring to FIG. 5, FIG. 5A, and to 5B, in which FIG. 5 is a perspective view of a nozzle flange 521 in accordance with another embodiment hereof, FIG. 5A is a sectional view of FIG. 5 taken along line A-A. FIG. 5B is a sectional view of FIG. 5 taken along line B-B. Features and aspects of the current embodiment can be used accordingly with the other embodiments. Nozzle flange 521 includes a body portion 550 and an adaptor plate 579. Body portion 550 includes a stepped bore 551, and a support ring 554 which defines an alignment surface 540, and adaptor plate 579 includes a clearance bore 552, a locating bore 553, a sliding surface 524, and a primary transfer channel 558A extending there through.

Adaptor plate 579 is located relative body portion 550 via a boss 580 projecting from the downstream surface of adaptor plate 579 which is received in a corresponding adaptor bore 581 in the upstream surface of body portion 550. As shown in FIGS. 5 and 5A, adaptor plate 579 and body portion 550 are coupled together by one or more fasteners.

Stepped bore 551 extends through body portion 550 and defines a secondary transfer channel 558B and internal threads 559. Secondary transfer channel 558B is a continuation of primary transfer channel 558A, and together they define an upstream portion of nozzle channel 119 In the current embodiment nozzle inlet 123 is located at the upstream end of primary transfer channel 558A.

Referring to FIG. 5A, clearance bore 552 extends through adaptor plate 579. A fastener 560 extends through clearance bore 552, and is received in fastening bore 361 in manifold 108 (not shown in FIG. 5A) to attach nozzle flange 521 to manifold 108.

Continuing with FIG. 5A, a spacer 567 is provided between a first shoulder 565 of fastener 560 and adaptor plate 579. In the current embodiment spacer 567 is a washer, and the combined length of clearance bore 552 and spacer 567 is equal to or greater than the length of fastener 560 between a first shoulder 565 and a second shoulder 566, such that tightening fastener 560 until second shoulder 566 engages with the downstream surface of manifold 108 causes a head portion 564 of fastener 560 to bear upon spacer 567 to create a compression force between adaptor plate 579 and manifold 108.

Turning to FIG. 5B, locating bore 553 extends from sliding surface 524 and through adaptor plate 579. Biasing member 368 is positioned in locating bore 553 and projects beyond sliding surface 524 and into receiver 370 provided in sliding surface 116 of manifold 108. Locating bore 553 extends through adaptor plate 579 and is threaded to receive biasing member 368, which in the current embodiment is a ball plunger. Protrusion 369 (ball portion) of biasing member 368 (ball plunger) projects beyond sliding surface 524 to mate with receiver 370. Compression force between adaptor plate 579 and manifold 108 creates an end force between protrusion 369 and receiver 370. In the current embodiment, the length of biasing member 368 is greater than the thickness of adaptor plate 579. To accommodate the portion of ball plunger that protrudes beyond downstream surface of adaptor plate 579, a space 582 is provided in the upstream surface of body portion 550.

Figure 6:
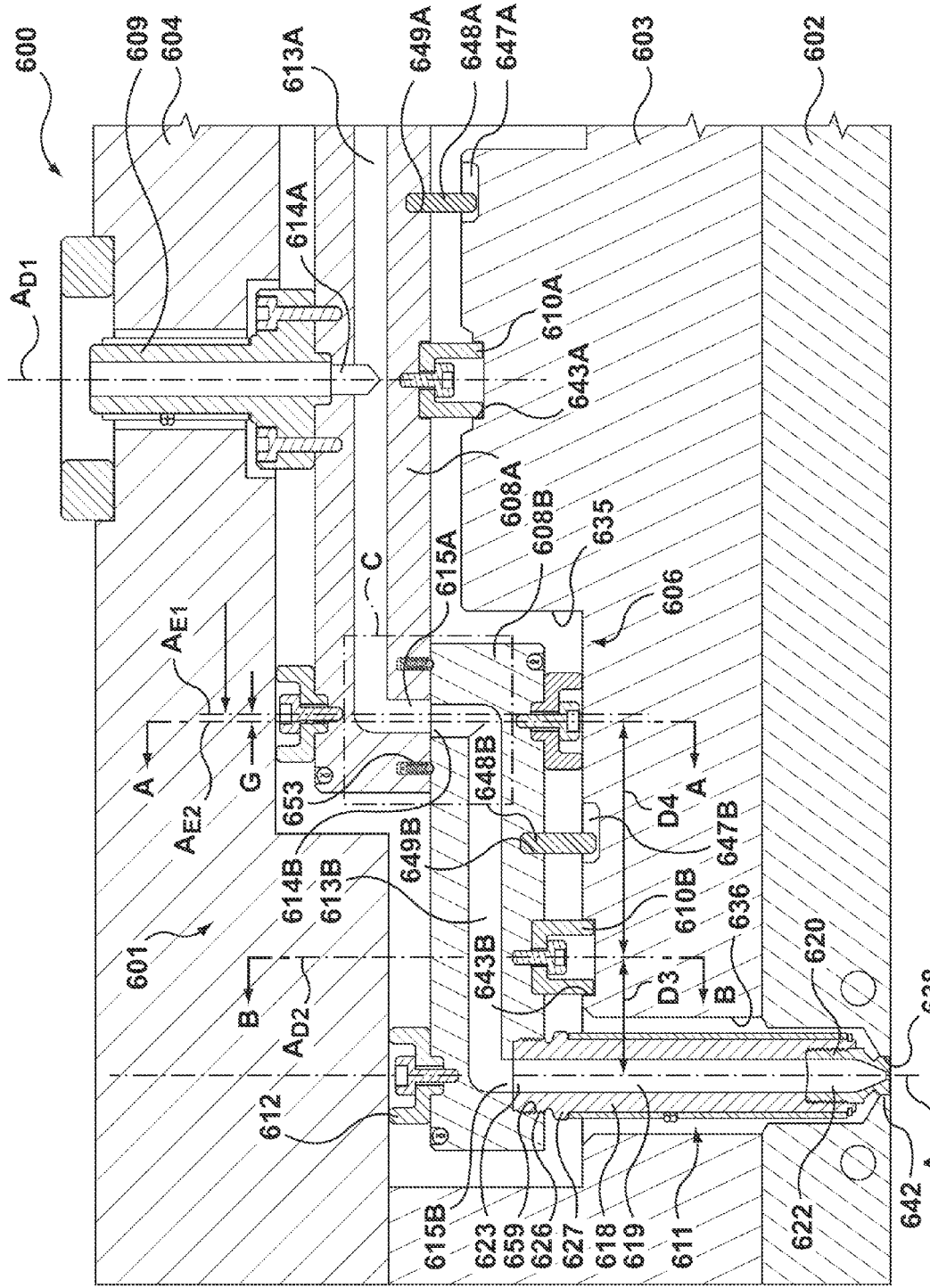
FIG. 6 is a sectional view of a portion of a hot-half having a hot runner system in accordance with another embodiment hereof.
Figure 6A:
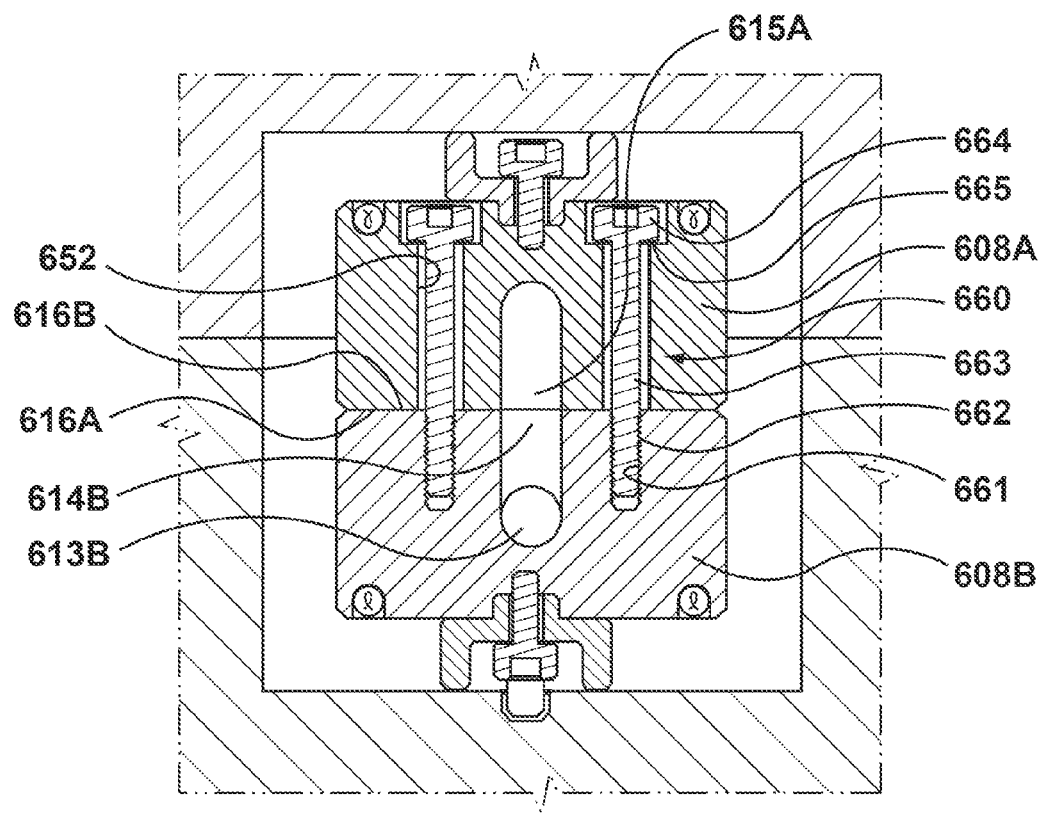
FIG. 6A is a sectional view of FIG. 6 taken along line A-A.
Figure 6B:
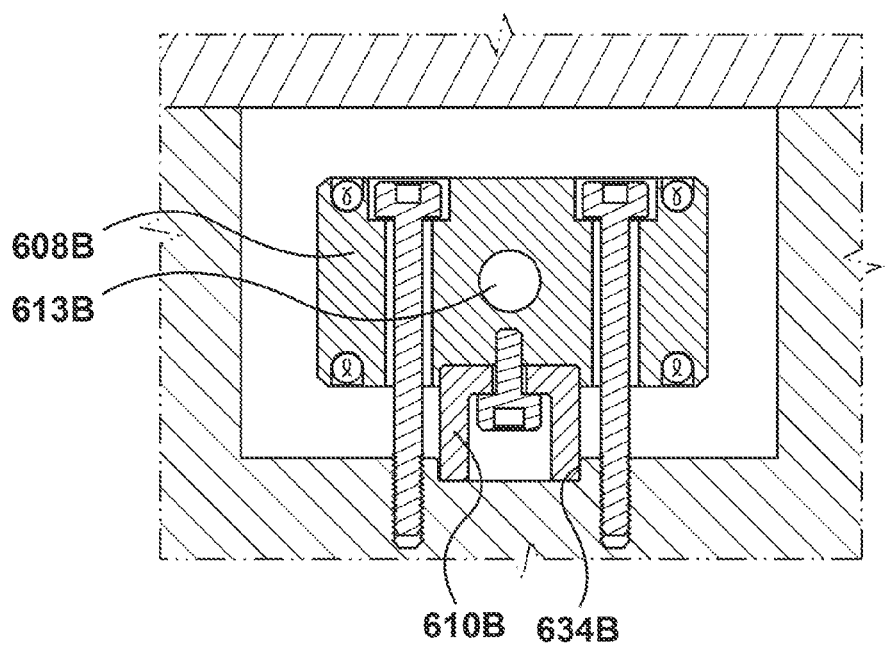
FIG. 6B is a sectional view FIG. 6 taken along line B-B.
Figure 6C:
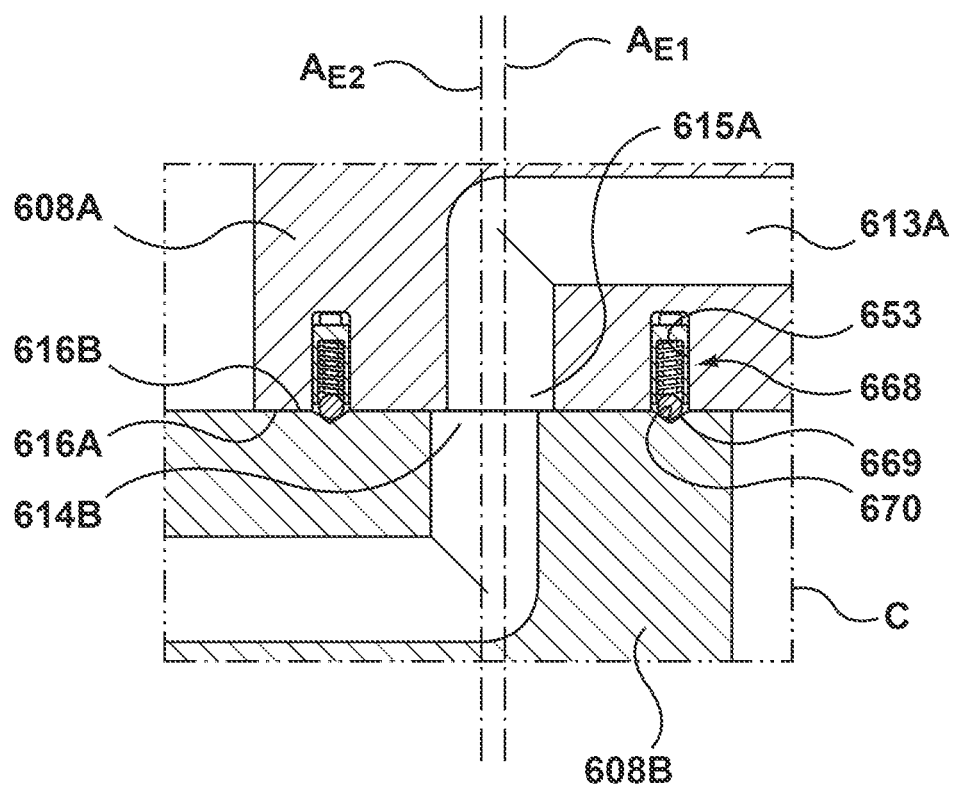
FIG. 6C is an enlarged view of a portion C of FIG. 6.

Referring now to FIG. 6, FIG. 6A, FIG. 6B, and FIG. 6C in which FIG. 6 is a sectional view of a portion of a hot-half 600 having a hot runner system 601 in accordance with another embodiment hereof, FIG. 6A is a sectional view of FIG. 6 taken along line A-A, and FIG. 6B is a sectional view of FIG. 6 taken along line B-B, and FIG. 6C is an enlarged view of a portion C of FIG. 6. Features and aspects of the current embodiment can be used accordingly with the other embodiments. Hot runner system 601 is a "drop-in" hot runner system which can be handled as a unitary assembly. Hot runner system 601 includes inter alia a primary manifold 608A, a secondary manifold 608B, an inlet extension 609, a primary manifold locating ring 610A, a secondary manifold locating ring 610B, a nozzle 611, and a pressure pad 612. Primary and secondary manifolds 608A, 608B can also be referred to as runner components 608A, 608B. In the current embodiment, primary and secondary manifolds 608A, 608B are arranged such that primary manifold 608A may be referred to as a bridge manifold and secondary manifold 608B may be referred to as a sub-manifold.

As described in the previous embodiment, relative lateral movement between a first runner component and a second runner component is created by lateral thermal expansion of only one of the runner components, i.e. manifold 108, whereas the other runner component, i.e. nozzle 111, is laterally fixed in position. Having regard to the embodiment of FIG. 6, relative lateral movement between a first runner component and a second runner component is created by lateral thermal expansion of the first runner component, i.e. primary manifold 608A, in a first direction and by lateral thermal expansion of the second runner component, i.e. secondary manifold 608B, in a second direction.

Primary manifold 608A includes a primary manifold channel or runner 613A extending between a primary manifold inlet 614A and a primary manifold outlet 615A. Primary manifold inlet 614A and primary manifold outlet 615A can be referred to as channel or runner apertures 614A, 615A. A primary expansion axis $A_E1$ extends through the center of primary manifold outlet 615A as measured at a primary sliding surface 616A on the downstream side of primary manifold 608A.

Secondary manifold 608B includes a secondary manifold channel or runner 613B extending between a secondary manifold inlet 614B and a secondary manifold outlet 615B. Secondary manifold inlet 614B and secondary manifold outlet 615B can be referred to as channel or runner apertures 614B, 615B. Secondary manifold 608B receives a stream of moldable material from primary manifold outlet 615A and distributes the stream of moldable material to secondary manifold outlet 615B. In the current embodiment, secondary manifold outlet 615B is in fluid communication with nozzle 611. Secondary manifold 608B further includes internal threads 659 adjacent to secondary manifold outlet 615B. A secondary expansion axis $A_E2$ extends through the center of secondary manifold inlet 614B as measured at a secondary sliding surface 616B on the upstream side of secondary manifold 608B. In operation, thermal expansion of secondary manifold 608B across its thickness causes secondary manifold 608B to bear upon a back plate 604, via pressure pad 612, and upon a manifold plate 603 via a secondary manifold locating ring 610B. In an alternative embodiment, for example, as shown in FIG. 6B, pressure pad 612 may be omitted, and secondary manifold 608B is restrained against flexing upwards by injection pressure by fasteners extending between secondary manifold 608B and mold plate 603. In a further embodiment both pressure pads 612 and fasteners extending between manifold 608B and mold plate 603 can be used to secure manifold 608B within hot half 600.

Nozzle 611 includes a nozzle body 618 and a nozzle channel 619 having a nozzle inlet 623 at an upstream end thereof. Nozzle channel 619 is in fluid communication between secondary manifold outlet 615B and a tip channel 622 in a nozzle tip 620. At its upstream end, nozzle body 618 includes external threads 626 and a radially projecting shoulder 627. External threads 626 mate with internal threads 659 in secondary manifold 608B to couple nozzle body 618 and secondary manifold 608B together. Threaded engagement between nozzle 611 and secondary manifold 608B creates a seal between nozzle inlet 623 and secondary manifold outlet 615B, and limits to axial growth of nozzle 611 to the downstream direction. Radially projecting shoulder 627 includes a plurality of wrench flats for mating with a suitable tool (not shown) to facilitate coupling and decoupling of nozzle body 618 and secondary manifold 608B.

Mold plates 602, 603 define an opening 606 in which hot runner system 601 is received. Opening 606 includes a pocket 635 and a stepped bore 636. Pocket 635 is defined by manifold plate 603, and is sized to create an insulating air space between primary and secondary manifolds 608A, 608B, and manifold plate 603. Stepped bore 636 extends from pocket 635 through manifold plate 603 and cavity plate 602, and is sized to create an insulating air space between nozzle body 618 and mold plates 603, 602.

In the current embodiment, hot-half 600 includes a primary datum axis $A_D1$ and a secondary datum axis $A_D2$. Primary datum axis $A_D1$ extends through the center of primary datum bore 643A, and secondary datum axis $A_D2$ extends through the center of secondary datum bore 643B. Primary manifold 608A is positioned relative to primary datum bore 643A, via primary manifold locating ring 610A. Primary datum axis $A_D1$ establishes a reference point from which lateral thermal expansion of primary manifold 608A extends. Secondary manifold 608B is positioned relative to secondary datum bore 643B, via secondary manifold locating ring 610B. Secondary datum axis $A_D2$ establishes a reference point from which lateral thermal expansion of secondary manifold 608A extends. In the current embodiment secondary datum axis $A_D2$ is offset from secondary manifold outlet 615B by a distance D3, and the amount of thermal expansion between secondary datum axis $A_D2$ and secondary manifold outlet 615B is absorbed by flexing or deflection of nozzle body 618.

Heat input to primary manifold 608A causes the distance between primary datum axis $A_D1$ and primary expansion axis $A_E1$ to expand, and heat input to secondary manifold 608B causes the distance between secondary datum axis $A_D2$ and secondary expansion axis $A_E2$ to expand.

A slot/dowel dowel arrangement in combination with manifold locating ring 610 is used to control the angular orientation of manifolds 608A, 608B. Manifold plate 603 includes a primary slot 647A and a secondary slot 647B. A primary dowel 648A projects from bore 649A in the downstream surface of primary manifold 608A and is received in primary slot 647A. A secondary dowel 648B projects from bore 649B in the downstream surface of secondary manifold 608B and is received in secondary slot 647B. Engagement between primary dowel 648B and primary slot 647A, and between secondary dowel 648B and secondary anti-rotation slot 647B aligns the angular position of primary and secondary manifolds 608A, 608B such that as primary and secondary manifolds 608A, 608B are heated, primary manifold outlet 615A and secondary manifold inlet 614B move toward each other.

Referring to FIG. 6 and also to FIG. 6A, primary manifold 608A includes a clearance bore 652 and a locating bore 653. Clearance bore 652 extends from sliding surface 616A through primary manifold 608A. A fastener 660 extends through clearance bore 652 and is received in a fastening bore 661 in sliding surface 616B of secondary manifold 608B to slidably couple primary and secondary manifolds 608A, 608B together. Fastener 660 includes a threaded end portion 662, a shank 663 and a head portion 665, and a first shoulder 665 is defined between shank 663 and head portion 664. When assembled, threaded end portion 662 is received in fastening bore 661. As secondary manifold 608B expands laterally, fastener 660 is displaced therewith (out of page view as shown in FIG. 6). Accordingly, the diameter of clearance bore 652 is sized to accommodate displacement of fastener 660 without impinging on thermal expansion of primary and secondary manifolds 608A, 608B. In the current embodiment fastener 660 is a socket head cap screw, and a repeatable compression force between primary manifold 608A and secondary manifold 608B is created by tightening fastener to a specific torque value.

Referring to FIG. 6C, locating bore 653 extends into primary manifold 608A from sliding surface 616A. A biasing member 668 is positioned in locating bore 653 and includes a protrusion 669 that projects beyond sliding surface 616A of primary manifold 608A and into a receiver 670 in sliding surface 616B of secondary manifold 608B.

In the current embodiment, locating bore 653 is a bore extending into sliding surface 616A of primary manifold 608A and biasing member 668 is a ball plunger that has a tool engaging feature adjacent to the ball portion of the ball plunger. Protrusion 669 (ball portion of ball plunger) projects beyond sliding surface 616B to mate with receiver 670. Compression force between primary manifold 608A and secondary manifold 608B creates an end force between ball portion of the ball plunger and receiver 670 when fastener 660 is tightened to create a compressive force between primary manifold 608A and secondary manifold 608B. In an alternative embodiment (not shown) the ball plunger is pressed fit in to cylindrical locating bore 653, and the elevation of the ball portion of the ball plunger is fixed relative to primary manifold sliding surface 616A.

Regardless of the specific layout chosen, the relative position of each locating bore 653 and its corresponding receiver 670 is such that when hot runner system 601 is installed in mold plates 602, 603, and is unheated, biasing member 668 is received in receiver 670 and primary manifold outlet 615A and secondary manifold inlet 614B are misaligned, and as hot runner system 601 is heated to the required processing temperature, thermal expansion thereof causes relative movement between locating bore 653 and receiver 670 which compresses biasing member 668.

Thermal expansion of primary and secondary manifolds 608A, 608B displaces receiver 670 relative to locating bore 653 and causes the internal load surface 673 of receiver 670 to bear upon external load surface 672 of protrusion 669 to compress biasing member 668.

Once primary manifold 608A and secondary manifold 608B are heated to the required processing temperature, primary expansion axis $A_E1$ and secondary expansion axis $A_E2$ are aligned to create a smoother transition for molding material flowing between primary manifold outlet 615A and secondary manifold inlet 614B than when hot runner system 601 is in a cold condition.

Figure 7:
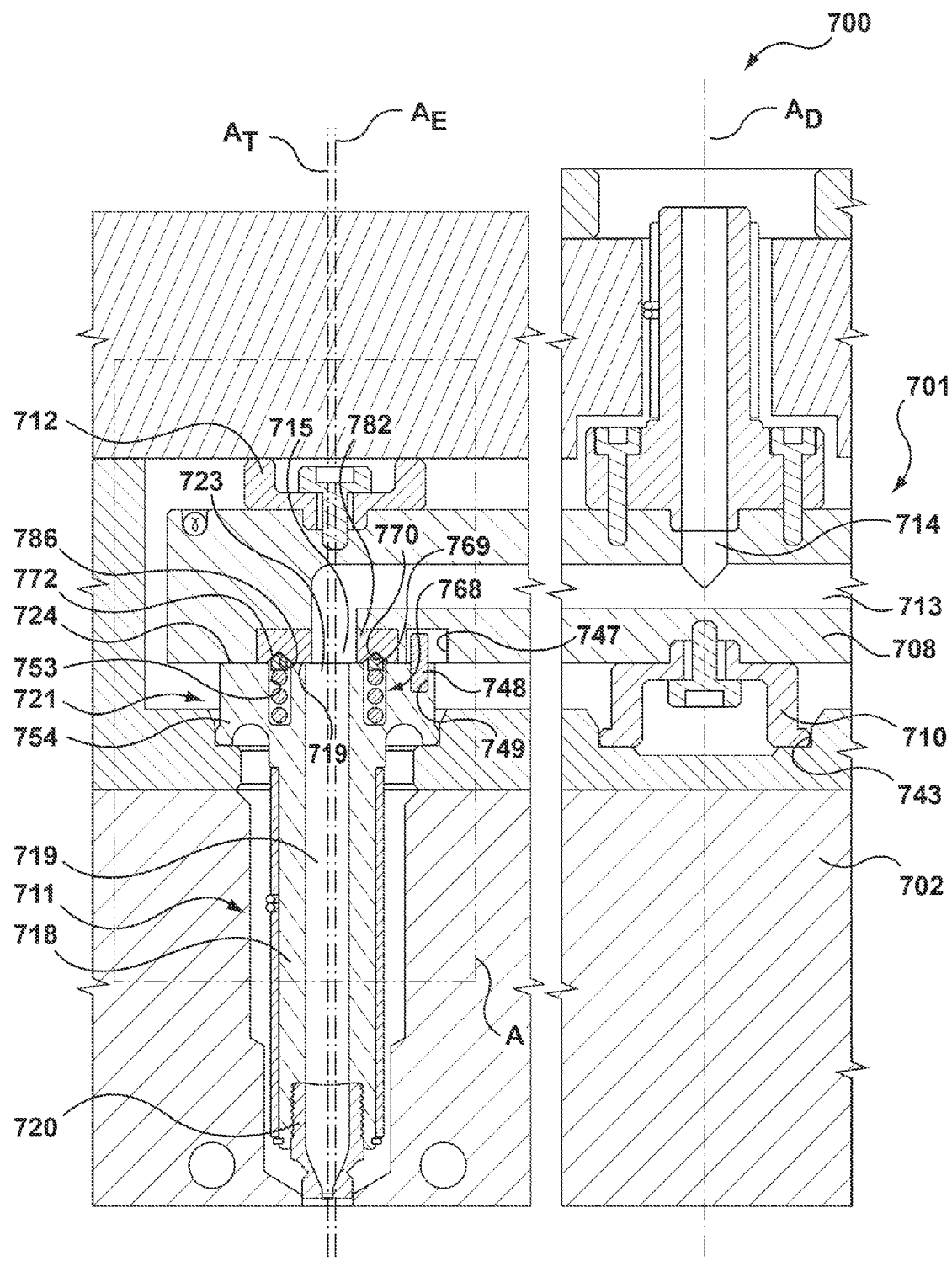
FIG. 7 is a sectional view of a partial hot-half having a hot runner system in accordance with an embodiment hereof that is in a cold condition.
Figure 8:
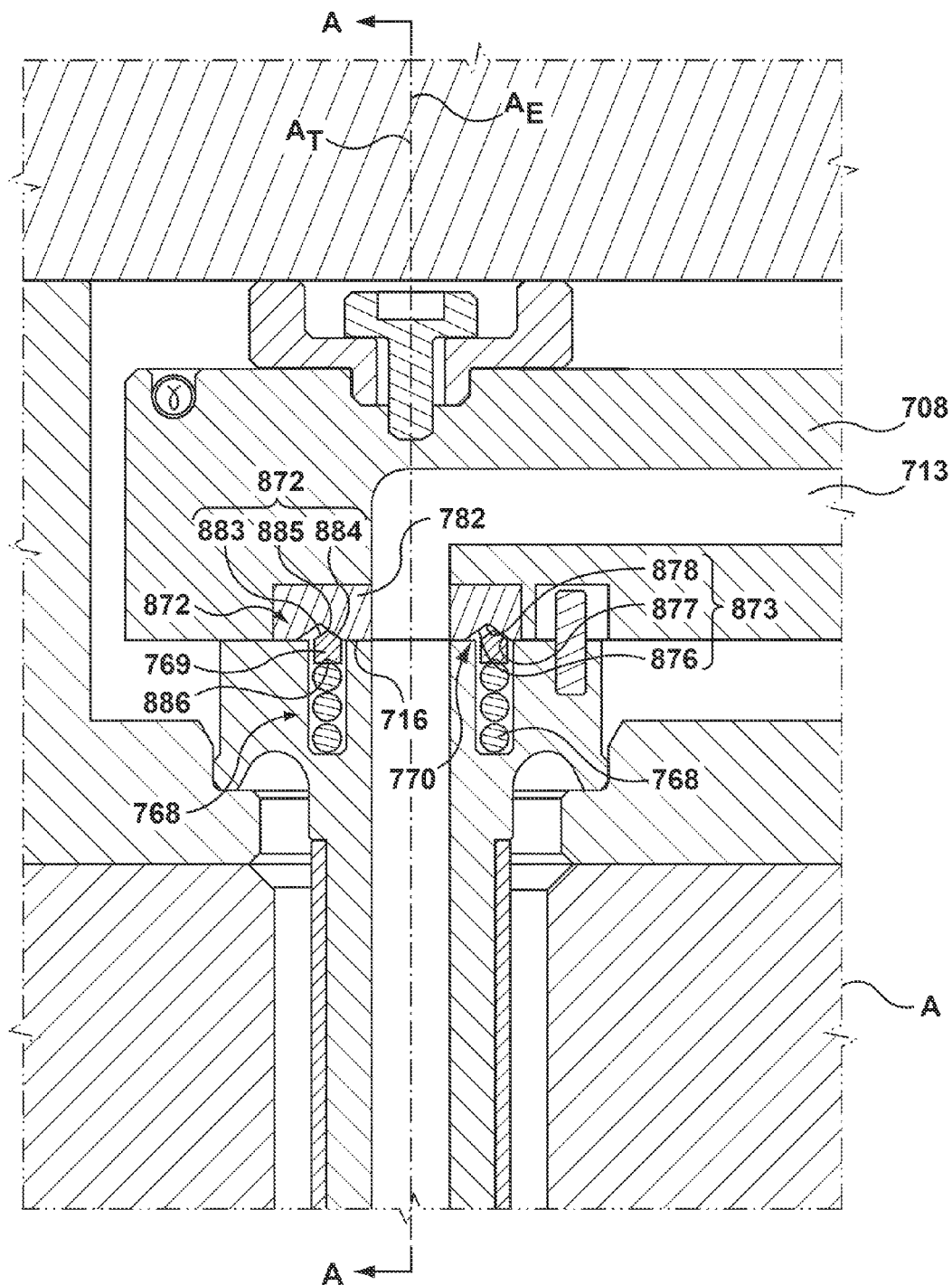
FIG. 8 is an enlarged view of a portion A FIG. 7 in which the hot runner system is heated to a processing temperature.
Figure 8A:
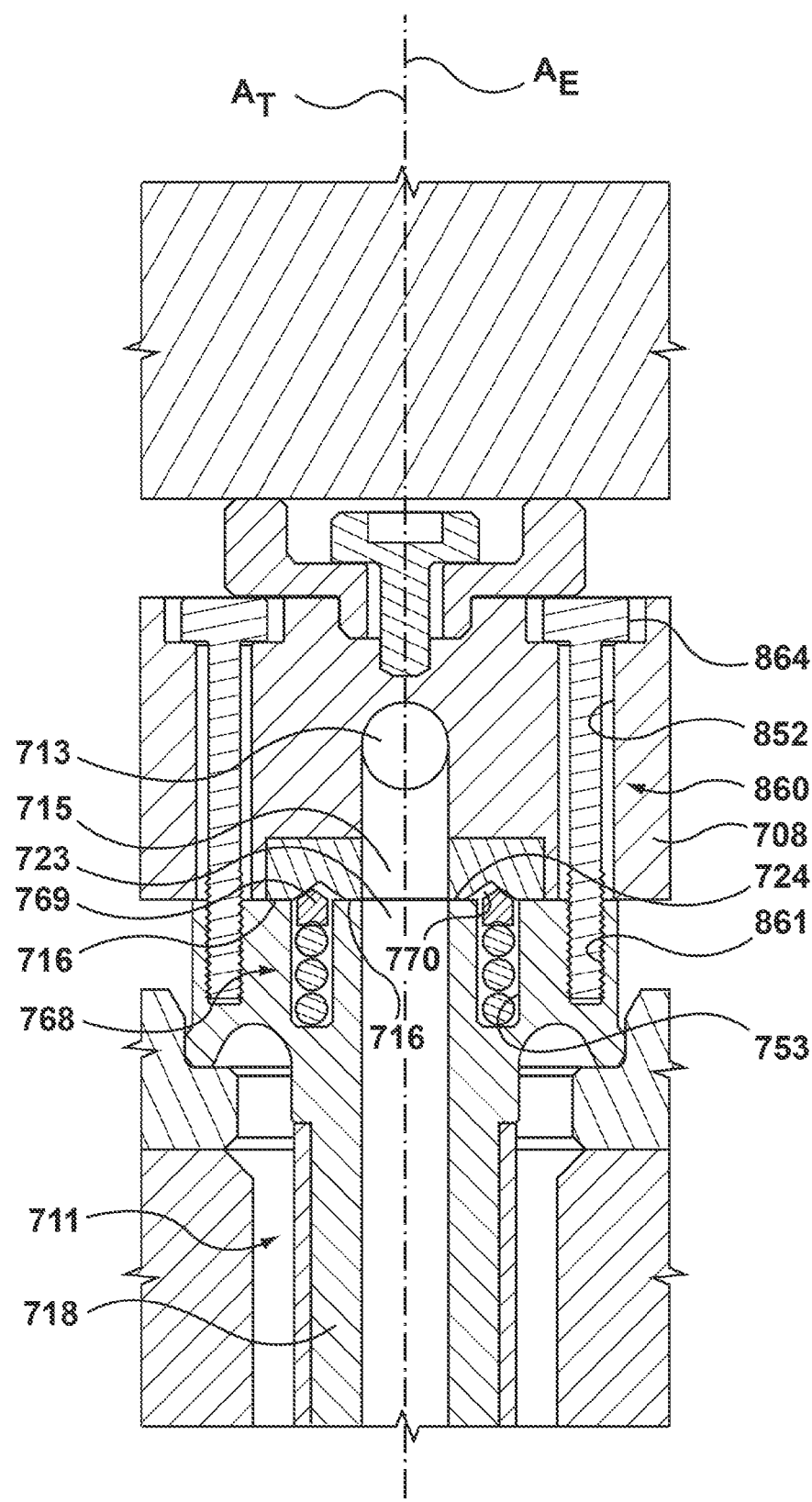
FIG. 8A is a sectional view of FIG. 8 taken along line A-A.

Referring now to FIG. 7, FIG. 8 and FIG. 8A, in which FIG. 7 is a sectional view of a portion of a hot-half 700 having a hot runner system 701 in accordance with an embodiment hereof that is in a cold condition, FIG. 8 is an enlarged view of a portion A of FIG. 7 in which hot runner system 701 is heated to a processing temperature, and FIG. 8A is a sectional view of FIG. 8 taken along line A-A. Features and aspects of the current embodiment can be used accordingly with the other embodiments. Hot runner system 701 includes, inter alia, a manifold 708, a manifold locating ring 710, a nozzle 711, and a pressure pad 712. Manifold 708 includes a manifold channel or runner 713 extending between a manifold inlet 714 and a manifold outlet 715, and an expansion axis $A_E$ extends through the center of manifold outlet 715 as measured at a sliding surface 716 on the downstream side of manifold 708. Manifold 708 can be referred to as a runner component 708, and manifold inlet 714 and manifold outlet 715 can be referred to as runner or channel apertures 714, 715. Hot-half 700 further includes a datum axis $A_D$ which is coaxial with a datum bore 743 in a mold plate 702, and manifold 708 is positioned relative to datum bore 743 via a manifold locating ring 710.

Nozzle 711 includes, inter alia, a nozzle body 718, a nozzle tip 720, a nozzle flange 721, and a nozzle channel or runner 719 extending through nozzle body 718, and also includes a fastening bore 861 (shown in FIG. 8A) and a locating bore 753 extending into nozzle body 718 from a nozzle sliding surface 724. Nozzle 711 can be referred to as a runner component 711. In the current embodiment the nozzle flange 721 is an integral part of nozzle body 718, and defines a support ring 754

A slot/dowel dowel arrangement in combination with manifold locating ring 710 is used to control the angular orientation of the lateral thermal expansion of manifold 708. The downstream surface of manifold includes a slot 747 and a dowel 748 projects from a bore 749 in sliding surface 724 of nozzle 711 and is received in slot 747. Engagement between dowel 748 and slot 747 aligns the angular position of expansion axis $A_E$ relative to a target axis $A_T$ such that lateral thermal expansion of manifold 708 will bring expansion axis $A_E$ and outlet 715 into alignment with target axis $A_T$ and nozzle inlet 723, which in the current embodiment extends through the center of nozzle inlet 723 as measured at sliding surface 724. Nozzle inlet 723 can be referred to as a runner or channel aperture 723.

As shown in FIG. 8A, a clearance bore 852 extends through manifold 708, and a fastener 860 extends through clearance bore 852, and is received in a fastening bore 861 in sliding surface 724 of nozzle body 718 to couple nozzle 711 and manifold 708 together. A compression force between manifold 708 and nozzle 711 is created by tightening fastener 860 when a head portion 864 of fastener 860 mates with a shoulder of clearance bore 852. As manifold 708 expands, clearance bore 852 is displaced therewith; however, the position of fastener 860 remains fixed relative to nozzle 711. Accordingly, the diameter of clearance bore 852 is sized to accommodate the lateral displacement of thereof without interfering with fastener 860 and impinging on thermal expansion of manifold 708. Nozzle body 718 includes two fastening bores 861 that are equispaced about nozzle inlet 723.

Returning to FIG. 7, locating bore 753 extends into nozzle body 718 from sliding surface 724. In the current embodiment locating bore 753 is an annular groove that is concentric with nozzle inlet 723. A biasing member 768 is seated in locating bore 753. Biasing member 768 has a protrusion 769 that is received in receiver 770 when nozzle 711 and manifold 708 are coupled together. In the current embodiment receiver 770 is provided in an insert 782 that defines sliding surface 716 of manifold 708. In the current embodiment biasing member 768 is a helical spring, and protrusion 769 is an annular ring that is slidable within locating bore 753. In an alternative embodiment (not shown) biasing member 768 is a disk spring or Belleville washer, and protrusion 769 is a portion of the disk spring that is received in receiver 770.

Turning to FIG. 8, protrusion 769 includes external load surface 872 that has a cross-section that is generally conical. Inner and outer sides 883, 884 of external load surface 872 are opposing arc segments that terminate at rounded vertex 885; however, other cross-sectional shapes for external load surface 872 are contemplated, such as those discussed having regard to the preceding embodiments. Opposite from external load surface 872, protrusion 769 has a concave groove 886 which seats protrusion 769 relative to biasing member 768.

Continuing with FIG. 8, in the current embodiment receiver 770 is an annular concavity in insert 782. Receiver 770 includes internal load surface 873 having a cross-section that is convex, and is generally conical. Inner and outer sides 876, 877 of internal load surface 873 are opposing arc segments that are angled inward to terminate at a rounded vertex 878; however, other shapes for receiver 770 are contemplated, such as those discussed having regard to the preceding embodiments. Insert 782 can be replaced if receiver 770 becomes worn or damaged. Insert 782 can be made from the same material as manifold 708, or can be made from a different material than manifold 708. In a non-limiting example, insert is made from a material that is more thermally conductive or has greater wear resistance than the material selected for the component in which it is received.

Returning to FIG. 8A, compression force between nozzle 711 and manifold 708 is created by tightening fastener 860 which energizes biasing member 768 and creates an end force between protrusion 769 and receiver 770. When protrusion 769 is received in receiver 770, nozzle 711 and manifold 708 are in a cold condition alignment in which manifold outlet 715 and nozzle outlet 723 are concentrically misaligned. As manifold 708 is heated to processing temperature, thermal expansion thereof causes the distance between datum axis $A_D$ and expansion axis $A_E$ to expand, which in turn displaces receiver 770 relative to locating bore 753 and biasing member 768 and protrusion 769 located therein. Relative lateral movement between receiver 770 and locating bore 753 in the direction of thermal expansion causes internal load surface 873 of receiver 770 to bear upon external load surface 872 of protrusion 769 which releases manifold 708 from being located relative to nozzle 711 and allows manifold outlet 715 to grow into a hot condition position relative to nozzle inlet 723.

In the preceding embodiments when the hot runner system is heated to a processing temperature or hot condition, expansion axis $A_E$ (or axes as in the case of the embodiment of FIG. 6) are described as being aligned relative to target axis $A_T$ to create a smoother transition for molding material flowing between the molding material outlet of an upstream hot runner component and the molding material inlet of a downstream hot runner component than when the hot runner system is unheated. When the hot runner system is heated to a desired processing temperature, under ideal conditions the molding material outlet of an upstream hot runner component and the molding material inlet of a downstream hot runner component are concentric and expansion axis $A_E$ and target axis $A_T$ are coaxial; however, it should be appreciated that this represents an ideal situation. In some circumstances, one or both of the upstream hot runner component and the downstream hot runner component may need to be heated more or less than expected, for example to facilitate material flow, and/or the mold plates may need to be cooled (relative to the temperature of the hot runner system) more or less than expected, for example, to facilitate part solidification. In such instances expansion axis $A_E$ (or axes as in the case of the embodiment of FIG. 6) may not be concentrically aligned with target axis $A_T$. Likewise, the alignment between the molding material channel of the upstream hot runner component and the molding material channel of the downstream hot runner component may still be offset, however, the amount that the upstream molding material channel and the downstream molding material channel are offset is less than when the hot runner system is in the cold-condition.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A hot runner system comprising:
a nozzle having a nozzle body, a nozzle flange having an alignment surface, and a nozzle channel extending between a nozzle inlet and a nozzle outlet;
a manifold coupled to the nozzle, the manifold having a melt channel extending between a manifold inlet and a manifold outlet;
a biasing member having a depressible protrusion associated with one of the nozzle and the manifold; and
a receiver associated with the other of the manifold and the nozzle,
the biasing member and the receiver positioned such that when the nozzle and the manifold are coupled together so as to create an end force between the depressible protrusion and the receiver, the manifold and the nozzle are arranged in a drop-in position in which the nozzle inlet and the manifold outlet are misaligned.

2. The hot runner system according to claim 1, wherein the nozzle flange includes a body portion having a stepped bore extending therethrough.

3. The hot runner system according to claim 2, wherein the stepped bore includes internal threads sized to mate with external threads at an upstream end of the nozzle body to couple the nozzle body and the nozzle flange together.

4. The hot runner system according to claim 3, wherein the stepped bore further includes a transfer channel extending from between a nozzle sliding surface and the internal threads, wherein the transfer channel serves as an upstream portion of the nozzle channel such that the nozzle inlet is located at the upstream end of the transfer channel.

5. The hot runner system according to claim 2, wherein the nozzle flange includes a clearance bore that extends through the body portion from a nozzle sliding surface and a fastener extends through the clearance bore and is received in a threaded fastening bore in a manifold sliding surface to attach the nozzle flange to the manifold.

6. The hot runner system according to claim 5, further comprising:
a spacer disposed between a shoulder of the fastener and the body portion.

7. The hot runner system according to claim 6, wherein the spacer comprises one or more disk springs, and wherein the fastener energizes the spacer to create a holding force between the nozzle sliding surface and a manifold sliding surface.

8. The hot runner system according to claim 2, wherein the nozzle flange includes a plurality of locating bores extending into the body portion from a nozzle sliding surface, and a respective biasing member is positioned in each locating bore to project beyond the nozzle sliding surface into a respective receiver in a manifold sliding surface.

9. The hot runner system according to claim 8, wherein each respective biasing member is a ball plunger and the depressible protrusion is a ball portion of each ball plunger.

10. The hot runner system according to claim 8, wherein each respective receiver is a concavity in the manifold sliding surface, and wherein an internal load surface of the receiver has a cross-sectional shape that is tapered.

11. The hot runner system according to claim 9, wherein each respective receiver is a cylindrical bore in the manifold sliding surface, and the diameter of receiver is between one-third and one-half of the diameter of the ball portion of the ball plunger.

12. The hot runner system according to claim 1, wherein the receiver is defined by an insert in one of the nozzle and the manifold.

13. The hot runner system according to claim 1, wherein the nozzle flange includes a heater.

14. A hot runner system comprising:
a manifold having a melt channel extending between a manifold inlet and a manifold outlet;
a nozzle coupled to the manifold, the nozzle having a nozzle body, a nozzle flange, and a nozzle channel in fluid communication with the manifold channel;
a biasing member associated with one of the manifold and the nozzle, the biasing member including a depressible protrusion; and
a receiver associated with the other of the manifold and the nozzle, the receiver being positioned relative to the biasing member so as to facilitate cold condition positioning of the nozzle relative to the manifold when the nozzle is coupled to the manifold,
the biasing member, the depressible protrusion, and the receiver permitting the manifold to slide relative to the nozzle when the hot runner system is installed in a hot half and is heated to a processing temperature.

15. The hot runner system according to claim 14, wherein the nozzle flange includes a body portion having a stepped bore extending therethrough, and an adaptor plate coupled to the body portion.

16. The hot runner system according to claim 15, wherein the stepped bore includes internal threads sized to mate with external threads at an upstream end of the nozzle body to couple the nozzle body and the nozzle flange together.

17. The hot runner system according to claim 16, wherein the adaptor plate includes a nozzle sliding surface and a primary transfer channel, and the stepped bore includes a secondary transfer channel, the primary transfer channel and the secondary transfer channel together defining an upstream portion of the nozzle channel.

18. The hot runner system according to claim 15, wherein the adaptor plate includes a clearance bore that extends through the body portion from a nozzle sliding surface, and a fastener extends through the clearance bore and is received in a threaded fastening bore in a manifold sliding surface to attach the nozzle flange to the manifold.

19. The hot runner system according to claim 18, further comprising a spacer disposed between a first shoulder of the fastener and the adaptor plate.

20. The hot runner system according to claim 19, wherein the spacer is a washer, and a combined length of the clearance bore and the spacer is equal to or greater than a length of the fastener between the first shoulder and a second shoulder thereof, such that tightening the fastener until the second shoulder engages with a downstream surface of the manifold causes a head portion of the fastener to bear upon the spacer to create a compression force between the adaptor plate and the manifold.

21. The hot runner system according to claim 15, wherein the adaptor plate includes a plurality of locating bores extending into the body portion from a nozzle sliding surface, wherein a respective biasing member is positioned in each locating bore to project beyond the nozzle sliding surface into a respective receiver in a manifold sliding surface.

22. The hot runner system according to claim 21, wherein each respective biasing member is a ball plunger and the depressible protrusion is a ball portion of each ball plunger.

23. The hot runner system according to claim 21, wherein each respective receiver is a concavity in the manifold sliding surface and wherein a profile of an internal load surface of the receiver has a cross-sectional shape that is tapered.

24. The hot runner system according to claim 22, wherein the receiver is a cylindrical bore in the manifold sliding surface, and the diameter of receiver is between one-third and one-half of the diameter of the ball portion of the ball plunger.

25. The hot runner system according to claim 14, wherein the receiver is defined by an insert in one of the nozzle and the manifold.

26. The hot runner system according to claim 14, wherein the nozzle flange includes a heater.

* * * * *

UNITED STATES PATENT AND TRADEMARK OFFICE
CERTIFICATE OF CORRECTION

PATENT NO. : 9,550,317 B2
APPLICATION NO. : 14/942742
DATED : January 24, 2017
INVENTOR(S) : Fabricy Fairy et al.

It is certified that error appears in the above-identified patent and that said Letters Patent is hereby corrected as shown below:

In the Claims

Column 17, Line 3 (Claim 11): "of receiver" should be replaced with --of the receiver--.

Column 17, Line 16 (Claim 14): "the manifold channel" should be replaced with --the melt channel--.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*